US012617158B2

(12) United States Patent
Jayant et al.

(10) Patent No.: US 12,617,158 B2
(45) Date of Patent: May 5, 2026

(54) SYSTEM AND METHOD FOR GENERATING MOLTEN METAL DROPLETS FOR ADDITIVE MANUFACTURING

(71) Applicant: Indian Institute of Science, Karnataka (IN)

(72) Inventors: Hemang Kumar Jayant, Bangalore (IN); Manish Arora, Bangalore (IN)

(73) Assignee: Indian Institute of Science, Bangalore (IN)

( * ) Notice: Subject to any disclaimer, the term of this patent is extended or adjusted under 35 U.S.C. 154(b) by 321 days.

(21) Appl. No.: 18/574,265

(22) PCT Filed: Jun. 25, 2022

(86) PCT No.: PCT/IB2022/055913
§ 371 (c)(1),
(2) Date: Dec. 26, 2023

(87) PCT Pub. No.: WO2022/269575
PCT Pub. Date: Dec. 29, 2022

(65) Prior Publication Data
US 2024/0316869 A1 Sep. 26, 2024

(30) Foreign Application Priority Data
Jun. 26, 2021 (IN) .............................. 202141028798

(51) Int. Cl.
B29C 64/209 (2017.01)
B22F 12/53 (2021.01)
(Continued)

(52) U.S. Cl.
CPC ............ B29C 64/393 (2017.08); B22F 12/53 (2021.01); B22F 12/90 (2021.01); B29C 64/118 (2017.08);
(Continued)

(58) Field of Classification Search
CPC ........................... B29C 64/118; B29C 64/209
See application file for complete search history.

(56) References Cited

U.S. PATENT DOCUMENTS

| | | | | |
|---|---|---|---|---|
| 2017/0251713 A1* | 9/2017 | Warner | ................... | A23P 30/20 |
| 2020/0384683 A1* | 12/2020 | Kunihiro | ............... | B33Y 40/00 |
| 2022/0055304 A1* | 2/2022 | Gueller | ................. | B33Y 30/00 |

* cited by examiner

*Primary Examiner* — Yung-Sheng M Tsui
(74) *Attorney, Agent, or Firm* — Choi Capital Law PLLC; Kevin J Fournier

(57) ABSTRACT
The present disclosure relates to a system for additive manufacturing. The system includes a frame, a CNC bed configured with the frame. A metal dispensing mechanism configured to eject metal droplets on the CNC bed. The metal dispensing mechanism is configured to controllably move with respect to the CNC bed for manufacturing the object. The metal dispensing mechanism includes a first nozzle, functionally configured with the CNC bed, for controllably dispensing the metal droplets on the CNC bed, and the nozzle is fluidically configured with a reservoir having the metal. A piston configured with the reservoir, and the piston is configured to push the molten metal from the reservoir such the molten metal is released from the reservoir towards the first nozzle. The piston is made of thermally insulating material, and a transducer configured with the piston to facilitate mechanical jerking of the piston for facilitating the pushing of the molten metal from the reservoir.

7 Claims, 3 Drawing Sheets

(51) Int. Cl.

| | |
|---|---|
| *B22F 12/90* | (2021.01) |
| *B29C 64/118* | (2017.01) |
| *B29C 64/393* | (2017.01) |
| *B33Y 30/00* | (2015.01) |
| *B33Y 50/02* | (2015.01) |

(52) U.S. Cl.

CPC ............ *B29C 64/209* (2017.08); *B33Y 30/00* (2014.12); *B33Y 50/02* (2014.12)

SYSTEM AND METHOD FOR GENERATING MOLTEN METAL DROPLETS FOR ADDITIVE MANUFACTURING

TECHNICAL FIELD

The present disclosure relates to the field of additive manufacturing. More particularly the present disclosure relates to a system for generating molten metal droplets for additive manufacturing.

BACKGROUND

Background description includes information that may be useful in understanding the present invention. It is not an admission that any of the information provided herein is prior art or relevant to the presently claimed invention, or that any publication specifically or implicitly referenced is prior art.

In field of additive manufacturing, droplet-on-demand is one of the methods to generate small size molten metal droplet to print metal in multi-dimensional. Droplet-on-Demand (DoD) can be achieved using multiple techniques. Among all these DoD techniques, one of the ways to generate molten metal droplets is by using an actuator to push the molten metal using a metal piston. Using DoD, the actuator transfers the motion to piston which is kept inside the molten metal. The piston pushed the molten metal to eject the metal from nozzle. In this process as the metal is in the molten state at high temperature the metal piston transfers the heat from molten metal pool to the actuator or transducer and damages it due to overheating. Also, to protect the transducer from getting damaged a high-temperature compliant transducer or a dedicated cooling system for the transducer. This increases the overall cost of the additive manufacturing system.

Also, metal printers and polymer printers are commercially available as two separate machines due to their printing processes. Metals are printed at high temperatures as compared to polymer extrusion temperature. This temperature difference does not allow the printing of metal and polymer together. As an alternative to combined metal and metal printing, conductive inkprinters are available commercially to print conductive ink with a polymer. These printers print the conductive on the insulating surface to interconnect the electronic components to make a working electronic circuit. This technique is limited to print low-power electronic circuits in 2D due to its technology and the high electrical resistance of conductive inks. This limitation can be resolved by using direct metal for printing the electronic circuits in 3D and higher-dimensions.

There is, therefore, a need of an improved system for additive manufacturing that is free from the above discussed problems.

OBJECTS OF THE PRESENT DISCLOSURE

Some of the objects of the present disclosure, which at least one embodiment herein satisfy are as listed herein below.

It is an object of the present disclosure to provide a system for additive manufacturing, which requires less maintenance cost, as the transducer is protected from getting damaged from heat of the molten metal.

It is an object of the present disclosure to provide a system for additive manufacturing, which can enable printing of the metal without needing a high-temperature compliant transducer or a dedicated cooling system for the transducer.

It is an object of the present disclosure to provide a system for additive manufacturing, which uses heat insulated piston and reduces heat loss in the induction system.

It is an object of the present disclosure to provide a system for additive manufacturing, which uses heat insulated piston and reduces heat loss in the induction system.

It is an object of the present disclosure to provide a system for additive manufacturing, in which prevention of heating of the transducer can enable use of many other transducers which are suitable for low temperature usage for generating molten metal droplets.

It is an object of the present disclosure to provide a system for additive manufacturing that is capable of combined metal and polymer additive manufacturing system for printing electronic circuits in multi-dimensional along with its insulating body, and metal with polymer part in multi-dimensional such as 2D, 3D etc.

SUMMARY

The present disclosure relates to the field of additive manufacturing. More particularly the present disclosure relates to a system for generating molten metal droplets for additive manufacturing.

An aspect of the present disclosure pertains to a system for additive manufacturing. The system includes a frame, a computer numerical control (CNC) bed configured with the frame, for supporting an object to be manufactured thereon. The CNC bed is configured to move in multi-dimensional axis. A metal dispensing mechanism configured to eject-metal droplets on the CNC bed. The metal dispensing mechanism is configured to controllably move with respect to the CNC bed for manufacturing the object. The metal dispensing mechanism includes a first nozzle, functionally configured with the CNC bed, for controllably dispensing the metal droplets on the CNC bed, and the nozzle is fluidically configured with a reservoir having the metal. A piston configured with the reservoir, and the piston is configured to push the molten metal from the reservoir such the molten metal is released from the reservoir towards the first nozzle. The piston is made of thermally insulating and electrically insulating material, and a transducer configured with the piston to enable the piston for ejecting of the molten metal from the reservoir.

In an aspect, the thermally insulating material may comprise borosilicate glass.

In an aspect, the reservoir may be made of aluminium, and the reservoir is configured with a metal spool for receiving the metal.

In an aspect, the system may comprise an induction heater configured around the reservoir to melt the metal inside the reservoir.

In an aspect, the system transducer may be any of a magnetostrictive transducer and a piezoelectric transducer.

In an aspect, the transducer is electrically configured with a voltage source to receive input voltage pulses for facilitating the mechanical jerking of the piston.

In an aspect, the system may comprise a polymer extruder configured to extrude polymer, through a second nozzle configured with the CNC bed, on the CNC bed for manufacturing the object, and the polymer extruder is configured to move with respect to the CNC bed and the metal dispensing mechanism.

In an aspect, the polymer extruder may be configured with a polymer spool for receiving the polymer.

In an aspect, system may comprise a control unit, having a controller, operatively conjured with the CNC bed, the metal dispensing mechanism, and the polymer extruder, the control unit is configured to control relative motion between the bed, metal dispensing mechanism, and the polymer extruder, wherein the control unit is configured to control a sequence of operation of the CNC bed, the metal dispensing mechanism, and the polymer extruder.

In an aspect, the object can be configured to be manufactured by sequential extrusion of the polymer from the polymer extruder, and dispensing the molten metal from the metal dispensing mechanism.

Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
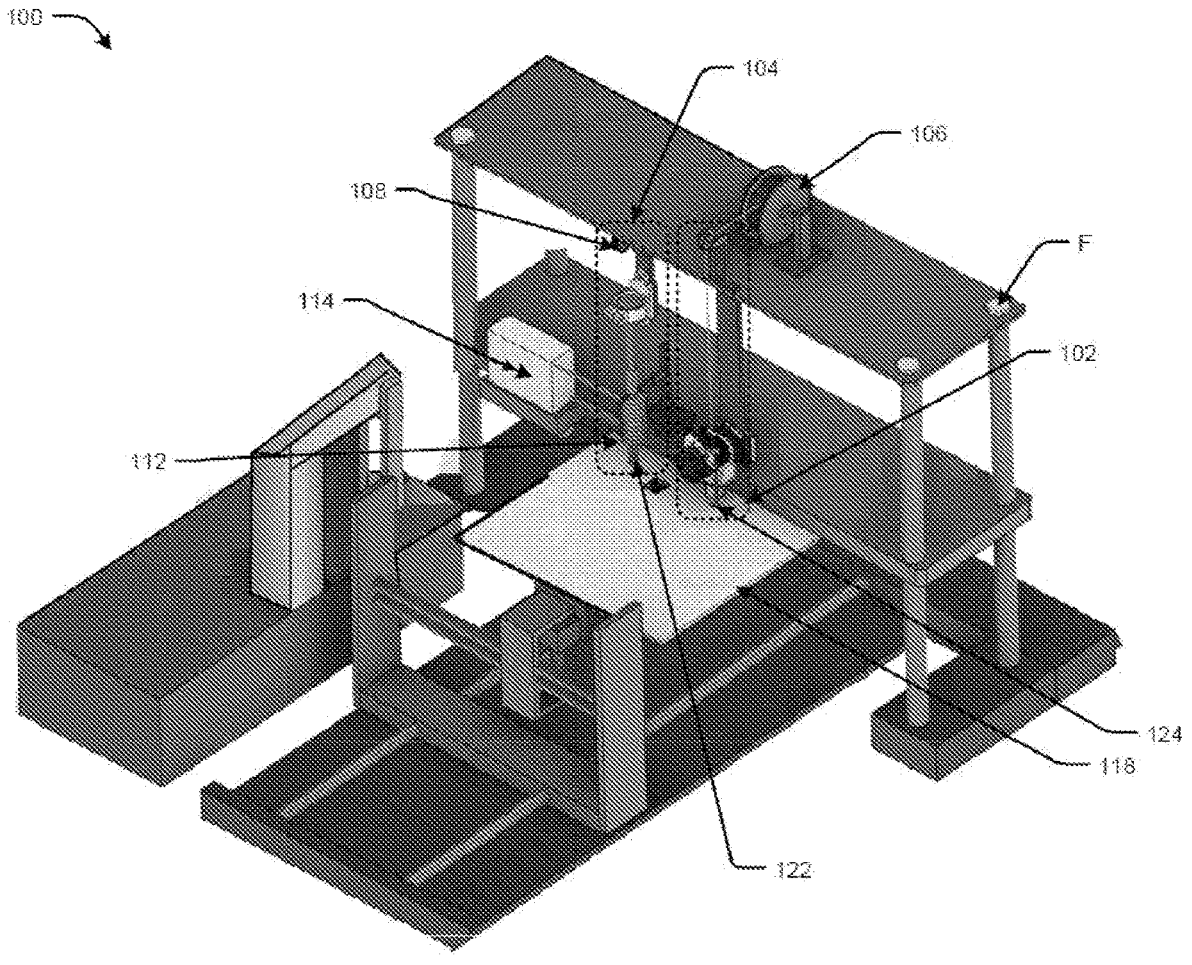
FIG. 1 illustrates an exemplary representation of a system for metal additive manufacturing, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

The present disclosure relates to the field of additive manufacturing. More particularly the present disclosure relates to a system for generating molten metal droplets for additive manufacturing.

The present disclosure elaborates upon a system for additive manufacturing. The system includes a frame, a computer numerical control (CNC) bed configured with the frame, for supporting an object to be manufactured thereon. The CNC bed is configured to move in multi-dimensional space; a metal dispensing mechanism configured to eject-metal droplets on the CNC bed. The metal dispensing mechanism is configured to controllably move with respect to the CNC bed for manufacturing the object. The metal dispensing mechanism includes a first nozzle, functionally configured with the CNC bed, for controllably dispensing the metal droplets on the CNC bed, and the nozzle is fluidically configured with a reservoir having the metal. A piston configured with the reservoir, and the piston is configured to push the molten metal from the reservoir such the molten metal is released from the reservoir towards the first nozzle. The piston is made of thermally insulating and electrically insulating material, and a transducer configured with the piston to enable, by transferring mechanical jerking, the piston for extruding of the molten metal from the reservoir.

In an embodiment, the thermally insulating material can comprise borosilicate glass.

In an embodiment, the reservoir can be made of aluminium, and the reservoir is configured with a metal spool for receiving the metal.

In an embodiment, the system can comprise an induction heater configured around the reservoir to melt the metal inside the reservoir.

In an embodiment, the system transducer can be any of a magnetostrictive transducer and a piezoelectric transducer.

In an embodiment, the transducer can be electrically configured with a voltage source to receive input voltage pulses for facilitating the mechanical jerking of the piston.

In an embodiment, the system can comprise a polymer extruder configured to extrude polymer, through a second nozzle functionally configured with the CNC bed, on the CNC bed for manufacturing the object, and the polymer extruder is configured to move with respect to the CNC bed and the metal dispensing mechanism.

In an embodiment, the polymer extruder can be configured with a polymer spool for receiving the polymer.

In an embodiment, system can comprise a control unit, having a controller, operatively conjured with the CNC bed, the metal dispensing mechanism, and the polymer extruder, the control unit is configured to control relative motion between the bed, metal dispensing mechanism, and the polymer extruder, wherein the control unit is configured to control a sequence of operation of the CNC bed, the metal dispensing mechanism, and the polymer extruder.

In an embodiment, the object can be configured to be manufactured by sequential extrusion of the polymer from the polymer extruder, and dispensing the molten metal from the metal dispensing mechanism.

FIG. 1 illustrates an exemplary representation of a system for metal additive manufacturing, in accordance with an embodiment of the present disclosure.

Figure 2:
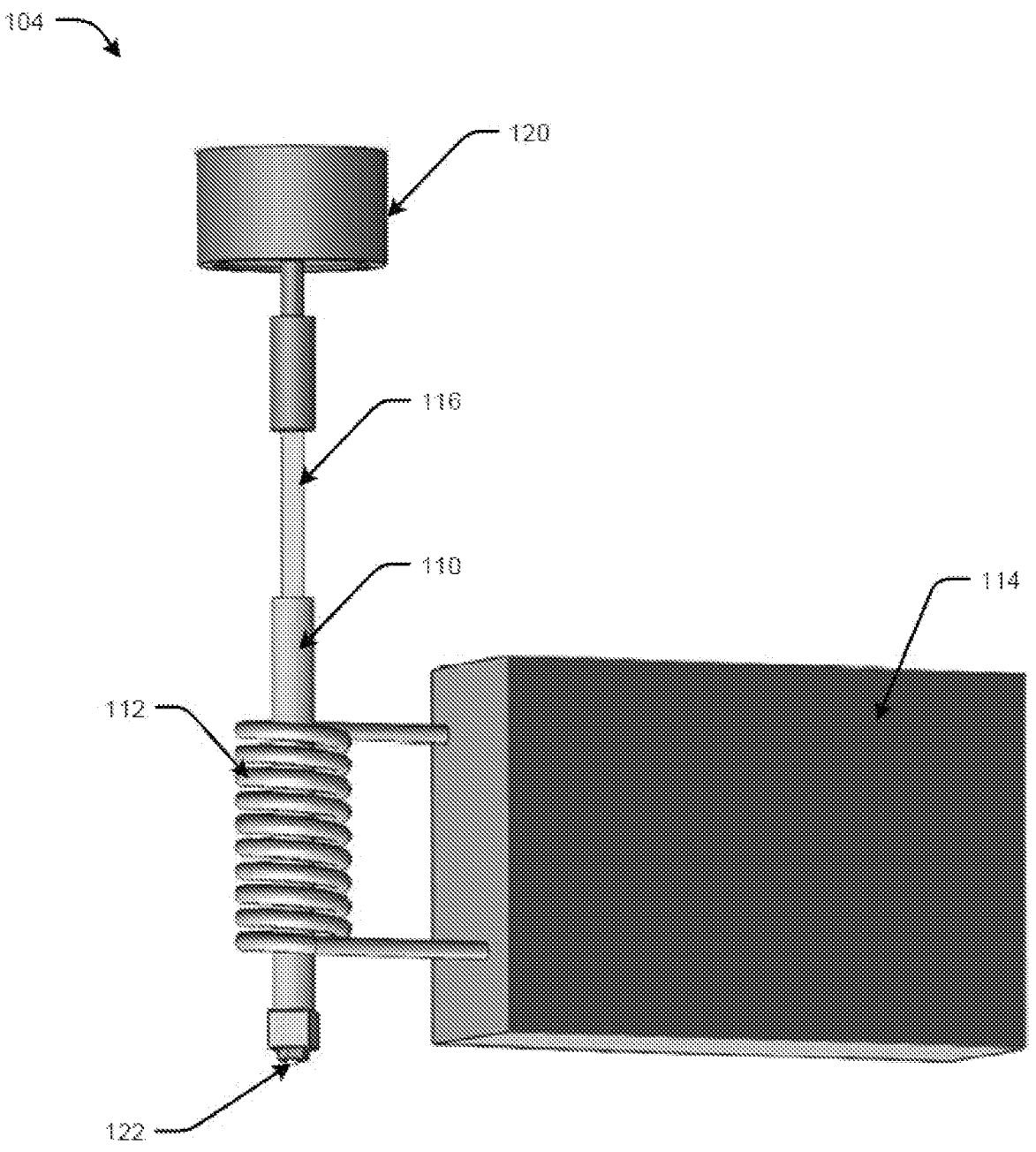
FIG. 2 illustrates an exemplary representation of a metal dispensing mechanism, in accordance with an embodiment of the present disclosure.

FIG. 2 illustrates an exemplary representation of a metal dispensing mechanism, in accordance with an embodiment of the present disclosure.

Figure 3:
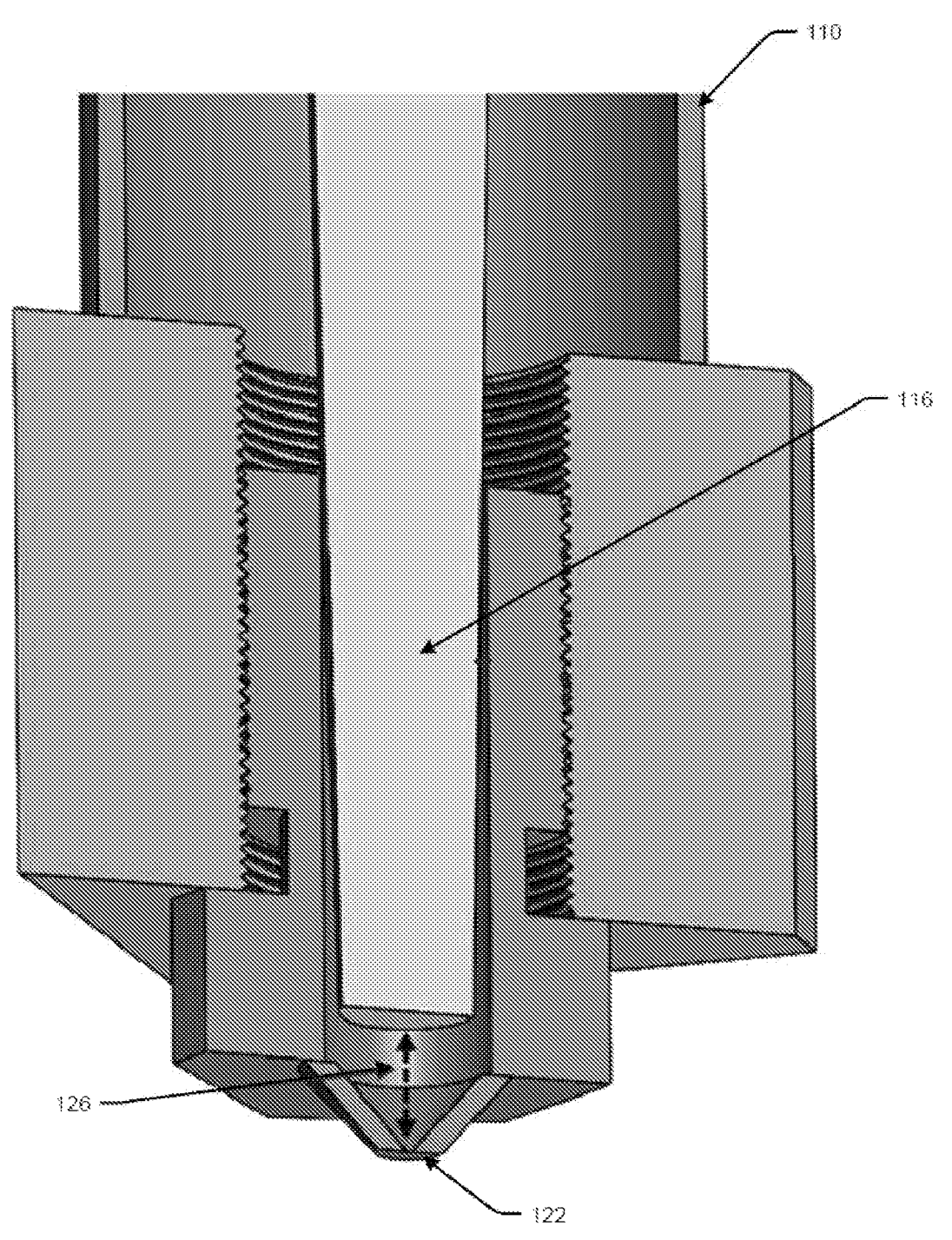
FIG. 3 illustrates an exemplary representation of a crucible inside the metal dispensing mechanism, in accordance with an embodiment of the present disclosure.

FIG. 3 illustrates an exemplary representation of a crucible inside the metal dispensing mechanism, in accordance with an embodiment of the present disclosure.

As illustrated, a system 100 for additive manufacturing can include a frame "F". A computer numerical control (CNC) bed 118 can be movably configured with the frame F, and the CNC bed 118 can be configured for supporting an object to be manufactured thereon. The CNC bed 118 can be configured to move in multi-dimensional space. A metal dispensing mechanism 104 can be configured to ejectmetal droplets on the CNC bed 118. The metal can be any low melting point conductive metal such as but not limited to copper, and aluminium. The metal dispensing mechanism 104 can be configured to controllably move with respect to the CNC bed 118 for manufacturing the object. The object can include but is not limited to an article and an electronic circuit. The system 100 can include a polymer extruder 102 that can be configured to extrude polymer on the CNC bed 118 for manufacturing the object. The polymer extruder 102 can be configured to move with respect to the CNC bed 118 and the metal dispensing mechanism 104. The polymer extruder 102 can be configured with a polymer spool 106 for receiving the polymer.

In an embodiment, the metal dispensing mechanism 104 can include a first nozzle 122 that can be positioned but is not limited to orthogonal to the CNC bed 118. The first nozzle 122 can have a hole of diameter around 1 to 300 microns, and can be configured to controllably dispensing the metal droplets on the CNC bed 118. The first nozzle 122 can be made of but not limited to stainless steel. The first nozzle 122 can be fluidically configured with a reservoir 110 having the metal therein. A piston 116 can be configured with the reservoir 110 and can be configured to push the molten metal from the reservoir 110 to release molten metal from the reservoir 110 towards the first nozzle 122. The piston 116 can be made of thermally insulating material such that but is not limited to borosilicate glass, and ceramic. A transducer 120 configured with the piston to facilitate mechanical jerking of the piston for facilitating the pushing of the molten metal from the reservoir 110. The polymer extruder 102 can be configured to extrude polymer on to the CNC bed 118 through a second nozzle 124 fluidically configured with the polymer extruder 102. The first nozzle 122 and the second nozzle 124 can be functionally configured with the CNC bed, and can be configured in any direction (e.g. orthogonal) with respect to the CNC bed. The position of the first nozzle 122 and the second nozzle 124 can be varied (manually or automatically) in order to manufacture the object.

In an embodiment, the reservoir 110 can be made of but not limited to aluminium, and the reservoir can be configured with a metal spool 108 for receiving the metal. The system 100 can include an induction heater 114 having a coil 112 that can be configured around the reservoir 110 to melt the metal inside the reservoir 110. The transducer 120 can be but not limited to magnetostrictive material-based transducer and a piezoelectric transducer that can convert electrical signal to mechanical motion. The transducer 120 can be electrically configured with a voltage source (not shown) to receive input voltage pulses for facilitating the mechanical jerking of the piston. The transducer 120 can convert into the voltage pulses can be converted into mechanical jerks that can be transferred to the piston 116 for facilitating release of the molten metal from the reservoir 110.

In an embodiment, the mechanical jerk of the transducer 120, in the perpendicular direction to the CNC bed 118, can move the thermally insulating piston 116 towards the crucible or reservoir 110. The piston 116 made up of thermally insulating material is used to save the transducer 120 from damaging due to heat transfer from the reservoir 110. The thermally insulating piston 116 can act as thermal insulator between the heated molten metal and the transducer 120. Each pulse from the wave form generator (also referred as voltage source) can provide one molten metal droplet to be ejected from the first nozzle 122.

In an embodiment, for printing the metal in multidimensional, first, the metal can be melted inside the reservoir 110 using a zero-voltage-switching-based induction heating circuit 114 and induction coil 112. A metal (such as but not limited to solder alloy-Sn96.5Ag3.5) with a low melting point can be used to print the workpiece in multi-dimensional. As metal printing requires optimal temperature of the molten metal pool inside the reservoir 110. A temperature of the reservoir 110 can be maintained using but without limiting to K-type thermocouples. A temperature data of the reservoir 110 can be sensed and maintained, using temperature sensors, in a database and a corresponding change in the temperature data can be compared using computer-controlled algorithm. Using the temperature data, a predefined level of them molten metal inside the reservoir 110 can be maintained and once the level is achieved, the piston 116 can be actuated to start dispensing the molten metal drops out of the first nozzle 122.

In an embodiment, size of the molten metal ejected from the first nozzle 122 can depend upon any or combination of size of the nozzle hole, a gap 126 between the piston 116 and the first nozzle 122, the level of the molten metal inside the crucible, and amplitude, duration and frequency of the pulsed applied to the transducer 120. The drop size can be varied by varying any of discussed parameters to select a droplet of an optimum size. The system can include a control unit having a controller that can be operatively configured with the metal dispensing mechanism 104, the heating system, the wave form generator, the temperature sensors, and the magnetostrictive transducer 120. The dispensing of the metal droplet can be controlled using the controller. The type of the object can include but not limited to an electronics circuit, a PCB, and a multi-dimensional object.

In an embodiment, the CNC bed 118 can be associate with a multi-axis computer numeric control (CNC) motorized system. The CNC system can facilitate a movement and orientation of the workpiece in the space in three dimensions. The control unit can be configured to actuate the movement and reorientation of the work-bench in 3 dimensions based on a design file (CAD design file) of the object. During the metal printing process, a heat can be transferred from the molten metal pool to the glass piston and surrounding area (air). As borosilicate glass is a bad conductor of heat, it does not pass the heat from the molten metal pool to the transducer 120. This can prevent any damage to the transducer 120 caused by the heat, and can enable printing of the metal without needing a high-temperature compliant transducer 120 or a dedicated cooling system for the transducer.

In an embodiment, system can comprise a control unit, having a controller, operatively conjured with the CNC bed, the metal dispensing mechanism, and the polymer extruder, the control unit is configured to control relative motion between the bed, metal dispensing mechanism, and the polymer extruder. The control unit is configured to control a sequence of operation of the CNC bed, the metal dispensing mechanism, and the polymer extruder. It is important to control sequence of operation of the metal dispensing mechanism 104 and the polymer extruder since interaction between molten metal and polymer during combined metal-polymer printing is not straight-forward as the high-temperature molten metal can melt/damage the polymer layer. Polymer extruder 102 can be configured to extrude polymer first as a base for printing the metal.

In an embodiment, the polymer can include but is not limited to PLA/ABS (Polylactic Acid/Acrylonitrile Butadiene Styrene). The proposed additive manufacturing system can include one or more temperature sensing devices configured with the induction heater, and one or more flow sensing devices configured with the first nozzle and the second nozzle. The one or more sensing device and the one or more flow sensing device can be operatively configured with the controller, and the controller can be configured to control the temperature of the induction heater and the flow control of the first nozzle and the second nozzle based on the inputs from the one or more temperature sensing device and the one or more flow sensing devices.

In an embodiment, the induction heater 114 can be configured to heat the metal for printing, the piston 116 does not heat up as it is also thermally or heat insulating. This can reduce the power loss in the induction heating system and can prevent heating of transducer 120. Prevention of heating of the transducer can enable use of many other transducers which are suitable for low temperature usage for generating molten metal droplets, one can use a borosilicate-based glass piston 116 with a combination of different actuation transducer systems to generate molten metal droplets for the application of metal additive manufacturing.

In an embodiment, the proposed system 100 can print the mechanical parts using only metals and working electronic circuits in multi-dimensional using metal. The molten metal is deposited on the workpiece/CNC bed 118 by generating micron-size metal droplets using the metal droplet-on-demand technique. The proposed system 100 can provide a simple and easy to control actuation mechanism. In an embodiment, the system 100 can be fitted with one or more additional heads to deposit/extrude additional polymer, metal or ceramic material. This can enable fabrication of multi-material parts including but not limited to electronic circuits and functionally graded materials.

The proposed system can eject molten metal in the form of micron size droplets for the application of combined metal and polymer additive manufacturing. As the droplets can be generated in sub-millimeter sizes and at low temperatures, it opens a field of integrated additive manufacturing of metals and polymer in a single system. One potential application is to print electronic circuits where polymer will act as an insulator, and metal tracks will interconnect passive and active electronic components in 2D, 3D, and multi-dimensional.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

Advantages of the Invention

The proposed invention provides a system for additive manufacturing, which is cost effective, as the transducer is protected from getting damaged from heat of the molten metal.

The proposed invention provides a system for additive manufacturing, which requires less maintenance cost, as the transducer is protected from getting damaged from heat of the molten metal.

The proposed invention provides a system for additive manufacturing, which can enable printing of the metal without needing a high-temperature compliant transducer or a dedicated cooling system for the transducer.

The proposed invention provides a system for additive manufacturing, which uses heat insulated piston and reduces heat loss in the induction system.

The proposed invention provides a system for additive manufacturing, which uses heat insulated piston and reduces heat loss in the induction system.

The proposed invention provides a system for additive manufacturing, in which prevention of heating of the transducer can enable use of many other transducers which are suitable for low temperature usage for generating molten metal droplets.

The proposed invention provides a system for additive manufacturing that is capable of combined metal and polymer additive manufacturing system for printing electronic circuits in multi-dimensional along with its insulating body, and metal with polymer part in multi-dimensional.

We claim:

1. A system for additive manufacturing, the system comprising:
   a frame;
   a computer numerical control (CNC) bed, configured with the frame, for supporting an object to be manufactured thereon;
   a metal dispensing mechanism configured to eject metal droplets on the CNC bed, and the metal dispensing mechanism is configured to controllably move with respect to the CNC bed for manufacturing the object, the metal dispensing mechanism comprises;
      a first nozzle, functionally configured with the CNC bed, for controllably dispensing the metal droplets on the CNC bed, and the nozzle is fluidically configured with a reservoir having the metal,
      a piston configured with the reservoir made of aluminum, and the piston is configured to push the molten metal from the reservoir such the molten metal is released from the reservoir towards the first nozzle, wherein the piston is made of borosilicate glass, and
      a transducer configured with the piston to enable the piston for ejecting the molten metal from the reservoir; and
   a polymer extruder configured to extrude polymer through a second nozzle functionally configured with the CNC bed, on the CNC bed for manufacturing the object, and the polymer extruder is configured to move with respect to the CNC bed and the metal dispensing mechanism.

2. The system for additive manufacturing as claimed in claim 1, wherein the thermally insulating material comprises borosilicate glass.

3. The system for additive manufacturing as claimed in claim 1, wherein the reservoir is made of aluminium, and the reservoir is configured with a metal spool for receiving the metal.

4. The system for additive manufacturing as claimed in claim 1, wherein the system comprises an induction heater configured around the reservoir to melt the metal inside the reservoir.

5. The system for additive manufacturing as claimed in claim 1, wherein the polymer extruder is configured with a polymer spool for receiving the polymer.

6. The system for additive manufacturing as claimed in claim 1, wherein system comprises a control unit, having a controller, operatively conjured with the CNC bed, the metal dispensing mechanism, and the polymer extruder, the control unit is configured to control relative motion between the bed, metal dispensing mechanism, and the polymer extruder, wherein the control unit is configured to control a sequence of operation of the CNC bed, the metal dispensing mechanism, and the polymer extruder.

7. The system for additive manufacturing as claimed in claim 1, wherein the object is configured to be manufactured by sequential extrusion of the polymer from the polymer extruder, and dispensing molten metal from the metal dispensing mechanism.

* * * * *